United States Patent
Babaud et al.

(10) Patent No.: US 10,272,722 B2
(45) Date of Patent: Apr. 30, 2019

(54) TIRE COMPRISING ELASTOMERIC MIXTURES WITH A LOW LEVEL OF SULFUR

(71) Applicant: COMPAGNIE GENERALE DES ETABLISSEMENTS MICHELIN, Clermont-Ferrand (FR)

(72) Inventors: Jacques Babaud, Clermont-Ferrand (FR); Didier Vasseur, Clermont-Ferrand (FR); Delphine Nayrat, Clermont-Ferrand (FR)

(73) Assignee: Compagnie General Des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 15/742,760

(22) PCT Filed: Jul. 6, 2016

(86) PCT No.: PCT/EP2016/065906
§ 371 (c)(1),
(2) Date: Jan. 8, 2018

(87) PCT Pub. No.: WO2017/009121
PCT Pub. Date: Jan. 19, 2017

(65) Prior Publication Data
US 2018/0194168 A1    Jul. 12, 2018

(30) Foreign Application Priority Data

Jul. 10, 2015   (FR) ..................... 15 56555

(51) Int. Cl.
*B60C 1/00*     (2006.01)
*B60C 9/18*     (2006.01)
(Continued)

(52) U.S. Cl.
CPC .......... *B60C 1/0041* (2013.01); *B60C 9/1835* (2013.01); *B60C 9/2006* (2013.01);
(Continued)

(58) Field of Classification Search
None
See application file for complete search history.

(56) References Cited

U.S. PATENT DOCUMENTS 5,738,740 A    4/1998   Cluzel
6,397,913 B1   6/2002   Kanenari et al.

FOREIGN PATENT DOCUMENTS

EP    0943656 A1    9/1999
FR    1389428       1/1965
(Continued)

*Primary Examiner* — Nicole M. Buie-Hatcher
(74) *Attorney, Agent, or Firm* — Dickinson Wright PLLC

(57) ABSTRACT

The tire has a carcass reinforcement which has at least one layer and a crown reinforcement that is capped radially by a tread. The tire also includes a layer P of polymer compounds in contact with at least one working crown layer and in contact with the carcass reinforcement. The elastomer compounds forming the calendering layer, radially outermost with respect to the crown of the tire, of the carcass reinforcement layer have a relative density of sulfur bridges of less than 5%. The elastomer compounds forming the layer P have a relative density of sulfur bridges of less than 5%. The elastomer compounds are compositions based on at least one diene elastomer selected from the group of polybutadienes (BRs), synthetic polyisoprenes (IRs), natural rubber (NR), isoprene copolymers, butadiene copolymers with the exception of butadiene-nitrile copolymers (NBRs), apart from diene elastomers bearing carboxyl functions, and mixtures of these diene elastomers.

13 Claims, 1 Drawing Sheet

(51) Int. Cl.

| | | |
|---|---|---|
| *B60C 9/20* | (2006.01) | |
| *C08K 5/00* | (2006.01) | |
| *C08L 7/00* | (2006.01) | |
| *C08L 9/00* | (2006.01) | |
| *C08K 5/37* | (2006.01) | |
| *C08K 3/04* | (2006.01) | |
| *C08K 3/36* | (2006.01) | |

(52) U.S. Cl.
CPC .............. *C08K 5/0025* (2013.01); *C08K 5/37* (2013.01); *C08L 7/00* (2013.01); *C08L 9/00* (2013.01); *B60C 2001/0075* (2013.01); *C08K 3/04* (2013.01); *C08K 3/36* (2013.01)

(56) References Cited

FOREIGN PATENT DOCUMENTS

| | | |
|---|---|---|
| FR | 2222232 | 10/1974 |
| FR | 2728510 A1 | 6/1996 |
| GB | 1067856 | 5/1967 |
| GB | 1462656 | 1/1977 |
| WO | 9620095 A1 | 7/1996 |
| WO | 9924269 A1 | 5/1999 |

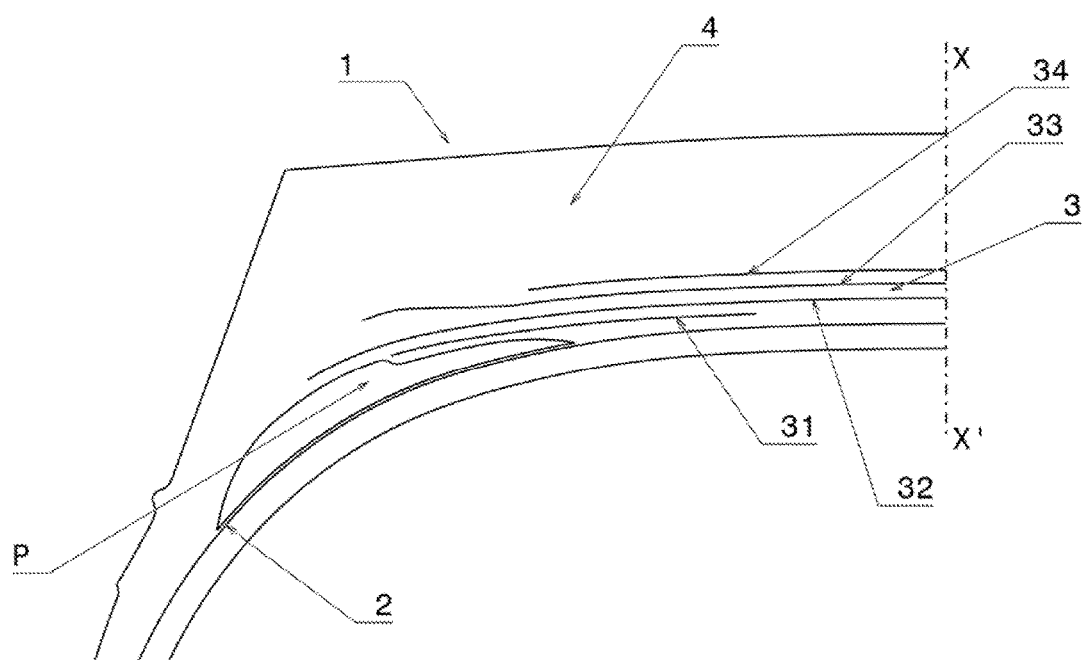

TIRE COMPRISING ELASTOMERIC MIXTURES WITH A LOW LEVEL OF SULFUR

CROSS-REFERENCE TO RELATED APPLICATION

The present application claims priority to PCT International Patent Application Serial No. PCT/EP2016/065906, filed Jul. 6, 2016 entitled "TYRE COMPRISING ELASTOMERIC MIXTURES WITH A LOW LEVEL OF SULFUR," which claims the benefit of FR Patent Application Serial No. 1556555, filed Jul. 10, 2015.

BACKGROUND OF THE INVENTION

1. Field of the Invention

The present disclosure relates to a tire with a radial carcass reinforcement, and more particularly a tire intended to equip vehicles that carry heavy loads and run at sustained speed, such as lorries, tractors, trailers or buses, for example.

2. Related Art

In the tires of heavy duty type, the carcass reinforcement is generally anchored on either side in the area of the bead and is surmounted radially by a crown reinforcement made up of at least two layers that are superimposed and formed of threads or cords which are parallel in each layer and crossed from one layer to the next, forming angles of between 10° and 45° with the circumferential direction. The working layers that form the working reinforcement may furthermore be covered with at least one layer, referred to as a protective layer, formed of reinforcing elements which are advantageously metallic and extensible and are referred to as elastic reinforcing elements. It may also comprise a layer of metal threads or cords having low extensibility, forming an angle of between 45° and 90° with the circumferential direction, this ply, referred to as the triangulation ply, being located radially between the carcass reinforcement and the first crown ply, referred to as the working ply, which are formed of parallel threads or cords lying at angles not exceeding 45° in terms of absolute value. The triangulation ply forms a triangulated reinforcement with at least the working ply, this reinforcement exhibiting little deformation under the various stresses to which it is subjected, the triangulation ply essentially serving to react the transverse compressive forces to which all the reinforcing elements in the crown region of the tire are subjected.

In the case of tires for "heavy duty" vehicles, just one protective layer is usually present and its protective elements are, in the majority of cases, oriented in the same direction and with the same angle in terms of absolute value as those of the reinforcing elements of the radially outermost and therefore radially adjacent working layer. In the case of construction plant tires intended for running on more or less uneven ground, the presence of two protective layers is advantageous, the reinforcing elements being crossed from one layer to the next and the reinforcing elements of the radially inner protective layer being crossed with the inextensible reinforcing elements of the radially outer working layer adjacent to the radially inner protective layer.

Cords are said to be inextensible when the cords exhibit, under a tensile force equal to 10% of the breaking force, a relative elongation at most equal to 0.2%.

Cords are said to be elastic when cords exhibit, under a tensile force equal to the breaking load, a relative elongation at least equal to 3% with a maximum tangent modulus of less than 150 GPa.

The circumferential direction of the tire, or longitudinal direction, is the direction that corresponds to the periphery of the tire and is defined by the direction in which the tire runs.

The axis of rotation of the tire is the axis about which it turns in normal use.

A radial or meridian plane is a plane which contains the axis of rotation of the tire.

The circumferential median plane, or equatorial plane, is a plane perpendicular to the axis of rotation of the tire and which divides the tire into two halves.

The transverse or axial direction of the tire is parallel to the axis of rotation of the tire. An axial distance is measured in the axial direction. The expression "axially inside of, or axially outside of, respectively" means "the axial distance of which, measured from the equatorial plane, is shorter than, or longer than respectively".

The radial direction is a direction that intersects the axis of rotation of the tire and is perpendicular thereto. A radial distance is measured along the radial direction. The expression "radially inside of, or radially outside of, respectively" means "the radial distance of which, measured from the axis of rotation of the tire, is shorter than, or longer than, respectively".

Some current tires, referred to as "road" tires, are intended to run at high speed and over increasingly long journeys, as a result of the improvement in the road network and of the growth of the motorway network throughout the world. The combined conditions under which such a tire is called upon to run without any doubt make possible an increase in the number of kilometers distance travelled, the wear on the tire being reduced, but on the other hand, the endurance of the tire and in particular of the crown reinforcement is detrimentally affected.

This is because there are stresses in the crown reinforcement and, more particularly, shear stresses between the crown layers, combined with a significant rise in the operating temperature at the ends of the working crown layers which result in the appearance and propagation of cracks in the rubber at the ends.

In order to improve the endurance of the crown reinforcement of the type of tire under consideration, solutions relating to the structure and quality of the layers and/or the profiled elements of rubber compounds which are placed between and/or around the ends of the plies and, more particularly, the ends of the axially shortest ply have already been applied.

Patent FR 1 389 428, in order to improve the resistance to degradation of the rubber compounds situated near the crown reinforcement edges, recommends the use, in combination with a low-hysteresis tread, of a rubber profiled element covering at least the sides and the marginal edges of the crown reinforcement and made up of a low-hysteresis rubber compound.

Patent FR 2 222 232, in order to avoid separations between crown reinforcement plies, teaches the coating of the reinforcement ends in a cushion of rubber of Shore A hardness different from that of the tread surmounting the reinforcement, and higher than the Shore A hardness of the profiled element of rubber compound placed between the edges of crown reinforcement and carcass reinforcement plies.

French application FR 2 728 510 proposes arranging, on the one hand, between the carcass reinforcement and the crown reinforcement working ply radially closest to the axis of rotation an axially continuous ply formed of inextensible metal cords forming with the circumferential direction an angle at least equal to 60° and of which the axial width is at least equal to the axial width of the shortest working crown ply and, on the other hand, between the two working crown plies an additional ply formed of metallic elements oriented substantially parallel to the circumferential direction.

French application WO 99/24269 also proposes, on each side of the equatorial plane and in the immediate axial continuation of the additional ply of reinforcing elements that are substantially parallel to the circumferential direction, that the two working crown plies formed of reinforcing elements crossed from one ply to the next be coupled over a certain axial distance and then decoupled by profiled elements of rubber compound at least over the remainder of the width common to the two working plies.

This improvement in the endurance of the tires makes it possible to consider at least the possibility of retreading when the tread has become worn. Specifically, where there is a desire to retread the tire after the tread has worn away, in order to optimize the use of the new tread the tire that is to be retreaded must not be in too advanced a state of ageing.

Furthermore, the tires of such vehicles may sustain damage through the tread, for example due to the penetration of a nail or screw. Such piercings of the tread may not be too detrimental, especially if the penetrating object is rapidly removed, in particular by human intervention as soon as the presence of the object is detected.

On the other hand, if this presence is not detected and if the object penetrates through the crown reinforcement of the tire as far as the internal cavity of the tire, this results in a loss of inflation air which seeps out slowly along the object.

Such a loss of inflation air, slow though it is, leads to a pressure drop which should alert the driver and enable the object to be detected and removed in order to repair the tire. Once again, if this detection is rapid enough, the damage to the tire may be very limited or even non-existent, a retreading of the tire not actually being compromised thereby.

These days certain vehicles are equipped with a device for automatically reinflating the tires as soon as a pressure drop is detected by sensors. This reinflation operation is then usually carried out without the knowledge of the driver. When such an operation is performed in the case of a piercing as presented above, it then becomes possible for the tire to continue to run with a piercing object for a relatively long time making it possible, for example, for the inflation air to reach the constituent rubber compounds of the tire between the cavity thereof and the outer surface of its tread.

The object, which may only be detected at the time of the tire retreading step, then results in the decision not to carry out the retreading, the constituent elements of the tire having been subjected to oxidation for an unknown period of time. Such oxidation may actually have resulted in premature ageing of the tire, in particular by promoting the propagation of cracks within the rubber compounds, the cracks possibly having been initiated during the penetration of the object.

There are also cases where the piercing object disappears and the tire, being equipped with a product present in the cavity that will seal the hole formed by the piercing object, may continue to be used normally. However, if the sealing is only carried out at the working plies or even at the tread, a whole region of the tire is subjected to the presence of the pressurized inflation air. As above, this creates an oxidation of the rubber compounds which may actually result in premature ageing of the tire.

SUMMARY OF THE INVENTION AND ADVANTAGES

The inventors thus set themselves the task of being able to provide tires in particular that are less vulnerable to the risks of premature ageing due to an object having pierced the tread through to the cavity of the tire.

This objective has been achieved according to the disclosure by a tire having a radial carcass reinforcement, of the radial carcass reinforcement including at least one layer formed of reinforcing elements inserted between two calendering layers of elastomer compound, the tire comprising a crown reinforcement comprising at least two working crown layers of reinforcing elements, the crown reinforcement being itself capped radially by a tread, the tread being joined to two beads via two sidewalls, the tire comprising at least one layer P of polymer compound in contact with at least one working crown layer and in contact with the carcass reinforcement, the at least one layer P of polymer compound extending axially to at least the axial end of the tread, at least the elastomer compounds forming the calendering layer, radially outermost with respect to the crown of the tire, of the at least one carcass reinforcement layer having a relative density of sulfur bridges measured according to the equilibrium swelling method of less than 5%, and the elastomer compounds forming the at least one layer P having a relative density of sulfur bridges measured according to the equilibrium swelling method of less than 5% and the elastomer compounds forming the calendering layer, radially outermost with respect to the crown of the tire, of the at least one carcass reinforcement layer and the elastomer compounds forming the at least one layer P being compositions based on at least one diene elastomer selected from the group of diene elastomers consisting of polybutadienes (abbreviated to "BRs"), synthetic polyisoprenes (IRs), natural rubber (NR), isoprene copolymers, butadiene copolymers with the exception of butadiene-nitrile copolymers (NBRs), apart from diene elastomers bearing carboxyl functions, and mixtures of these diene elastomers.

Within the meaning of the disclosure, the diene elastomer of the composition in accordance with the disclosure is selected from the group of diene elastomers consisting of polybutadienes (abbreviated to "BRs"), synthetic polyisoprenes (IRs), natural rubber (NR), isoprene copolymers, butadiene copolymers with the exception of butadiene-nitrile copolymers (NBRs), and mixtures of these elastomers. Such copolymers are preferentially selected from the group consisting of butadiene-stirene copolymers (SBRs), isoprene-butadiene copolymers (BIRs), isoprene-stirene copolymers (SIRs) and isoprene-butadiene-stirene copolymers (SBIRs). Diene elastomers are understood to mean modified or unmodified diene elastomers. If they are modified, they may be coupled and/or star branched or else functionalized, at the chain end or along the chain with the exception of the elastomers bearing carboxyl functions.

Within the meaning of the disclosure, the relative density of sulfur bridges is the density of sulfur bridges measured according to the equilibrium swelling method relative to the overall density of crosslinking bridges measured according to the equilibrium swelling method.

According to the disclosure, the tire advantageously comprises two layers P, and more precisely one in each of the shoulders, positioned symmetrically with respect to one another relative to the equatorial plane. According to certain embodiment variants, a layer P continues up to the equatorial plane, the two layers P then forming only a single continuous layer from one shoulder to the other of the tire.

Advantageously according to the disclosure, the elastomer compounds forming the two calendering layers of the at least one carcass reinforcement layer have a relative density of sulfur bridges measured according to the equilibrium swelling method less than 5%.

When the carcass reinforcement comprises several layers of reinforcing elements, all of the calendering layers advantageously consist of elastomer compounds having a relative density of sulfur bridges measured according to the equilibrium swelling method less than 5%.

According to one preferred embodiment of the disclosure, the at least two working crown layers each being formed of reinforcing elements inserted between two calendering layers of elastomer compounds, at least the elastomer compounds forming the calendering layer, radially closest to the carcass reinforcement, of a working crown layer have a relative density of sulfur bridges measured according to the equilibrium swelling method of less than 5%.

Preferably also according to the disclosure, at least the elastomer compounds forming the calendering layers of at least the working crown layer radially closest to the carcass reinforcement have a relative density of sulfur bridges measured according to the equilibrium swelling method of less than 5%.

In a tire comprising working crown layers radially outside of the carcass reinforcement, it is therefore the elastomer compounds forming the calendering layers of at least the radially innermost working crown layer which have a relative density of sulfur bridges measured according to the equilibrium swelling method of less than 5%.

In a tire comprising working crown layers radially inside of the carcass reinforcement, it is therefore the elastomer compounds forming the calendering layers of at least the radially outermost working crown layer which have a relative density of sulfur bridges measured according to the equilibrium swelling method of less than 5%.

In a tire comprising working crown layers radially distributed on either side of the carcass reinforcement, advantageously the elastomer compounds forming the calendering layers of at least the two working crown layers radially closest to the carcass reinforcement have a relative density of sulfur bridges measured according to the equilibrium swelling method of less than 5%.

According to one or other of these embodiments of the disclosure, the elastomer compounds having a relative density of sulfur bridges measured according to the equilibrium swelling method of less than 5% are compositions based on at least one diene elastomer selected from the group of diene elastomers consisting of polybutadienes (abbreviated to "BRs"), synthetic polyisoprenes (IRs), natural rubber (NR), isoprene copolymers, butadiene copolymers with the exception of butadiene-nitrile copolymers (NBRs), apart from diene elastomers bearing carboxyl functions, and mixtures of these diene elastomers.

According to one advantageous variant of the disclosure, the relative density of ionic bridges measured according to the equilibrium swelling method is greater than 50% in the elastomer compounds having a relative density of sulfur bridges measured according to the equilibrium swelling method of less than 5%.

Within the meaning of the disclosure, the relative density of ionic bridges is the density of ionic bridges measured according to the equilibrium swelling method relative to the overall density of crosslinking bridges measured according to the equilibrium swelling method.

Preferably also, the relative density of ionic bridges measured according to the equilibrium swelling method is greater than 60% in the elastomer compounds having a relative density of sulfur bridges measured according to the equilibrium swelling method of less than 5%.

More preferentially still, the relative density of ionic bridges measured according to the equilibrium swelling method is greater than 70% in the elastomer compounds having a relative density of sulfur bridges measured according to the equilibrium swelling method of less than 5%.

Advantageously also according to the disclosure, the relative density of carbon-carbon bridges measured according to the equilibrium swelling method is less than 45% in the elastomer compounds having a relative density of sulfur bridges measured according to the equilibrium swelling method of less than 5%.

Within the meaning of the disclosure, the relative density of carbon-carbon bridges is the density of carbon-carbon bridges measured according to the equilibrium swelling method relative to the overall density of crosslinking bridges measured according to the equilibrium swelling method.

Preferably also, the relative density of carbon-carbon bridges measured according to the equilibrium swelling method is less than 35% in the elastomer compounds having a relative density of sulfur bridges measured according to the equilibrium swelling method of less than 5%.

More preferentially still, the relative density of carbon-carbon bridges measured according to the equilibrium swelling method is less than 25% in the elastomer compounds having a relative density of sulfur bridges measured according to the equilibrium swelling method of less than 5%.

According to the disclosure, the measurements of crosslinking densities are carried out using the equilibrium swelling method. In order to measure the crosslinking density, the compounds, prepared in the form of samples, are swollen in toluene for 72 hours. The weight of the samples is measured immediately after having drained off the excess solvent using blotting paper. The swelling of the samples and the absorption of solvent is inversely proportional to the presence, and therefore to the density, of crosslinking bridges.

The samples are then dried under vacuum until a constant weight is reached. From the difference between the two weight values measured, the overall density of crosslinking bridges is deduced.

Use is made of isopropyl mercaptan to selectively attack the polysulfide bridges and of hexanethiol to indiscriminately break the polysulfide and disulfide bridges. The samples are treated for 2 hours with isopropyl mercaptan and 48 hours with hexanethiol at 25° C.

After each of these treatments, a measurement of the density of crosslinking bridges is calculated from the weight measurements of the samples after swelling, as described above.

It is thus possible to determine the percentage of sulfur bridges of the samples with regard to the overall density of crosslinking bridges. This measurement of sulfur bridges is described in particular in the publication "RUBBER CHEMISTRY AND TECHNOLOGY, Vol. 87, No. 1, pp. 21-30 (2014)".

In order to determine the percentage of ionic bridges, the same samples are subjected to a chemical attack by a treatment in toluene in the presence of chloroacetic acid for 120 hours. Such a treatment is described in the publication "POLYMER COMPOSITES—2011, 1513".

Once the samples are thus treated, measurements of the density of crosslinking bridges are carried out again by a swelling of the compounds in toluene for 72 hours. The weight of the samples is measured as above immediately after having drained off the excess solvent using blotting paper, then after drying to constant weight. The carbon-carbon bridges constitute the unattacked residual network.

Moreover, the percentage of ionic bridges is deduced therefrom by the difference between the values obtained previously.

The tests carried out with tires thus produced in accordance with the disclosure have shown that the tires have improved performance levels in terms of endurance especially when running with an object piercing the tire. The elastomer compounds having a relative density of sulfur bridges measured according to the equilibrium swelling method of less than 5% actually make it possible to limit the propagation of a large number of cracks initiated when an object pierces the tire.

The inventors have in particular been able to demonstrate that the cracks have a tendency to propagate essentially in the calendering layer of the carcass reinforcement that is radially outermost and at the level of the layer P as described above.

The inventors consider that they have been able to demonstrate that the relative density of sulfur bridges of less than 5% in portions of the tire as defined according to the disclosure makes it possible to reduce the sensitivity of the tires to the effects of ageing that are in particular due to temperature rises. Specifically, the inventors are inclined to interpret these results by choices of elastomer compounds in precisely defined zones that impart a better resistance to ageing that is in particular due to the presence of oxygen.

As stated previously, it is known that the presence of oxygen leads to oxidizing processes affecting rubber compositions and/or metal or textile reinforcers and/or the interfaces between these rubber compositions and these reinforcers.

The tests have also shown that it is then possible to consider retreading the tires despite the presence of an object that has pierced the tire, after the tire has been repaired. Specifically, the tests demonstrated that a tire according to the disclosure comprising a piercing object could run at least 30% more kilometers than a standard tire without revealing crack propagation prohibitive to retreading.

According to one advantageous embodiment of the disclosure, an elastomer compound having a relative density of sulfur bridges measured according to the equilibrium swelling method of less than 5% is a composition based on at least one diene elastomer, a zinc diacrylate derivative in the form of a zinc salt of formula (I)

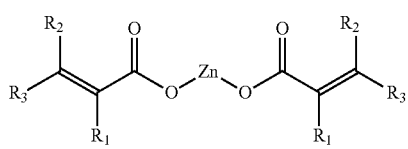

in which R1, R2 and R3 independently represent a hydrogen atom or a C1-C7 hydrocarbon group selected from linear, branched or cyclic alkyl groups, aralkyl groups, alkylaryl groups and aryl groups, optionally interrupted by one or more heteroatoms, it being possible for R2 and R3 to together form a nonaromatic ring, the composition additionally comprising a peroxide, the zinc diacrylate derivative and peroxide contents being such that the ratio of the peroxide content to the zinc diacrylate derivative content is less than or equal to 0.09.

Advantageously also, the composition comprises no reinforcing filler or comprises less than 65 phr thereof, the ratio of the filler content to the zinc diacrylate derivative content being less than or equal to 4.

The inventors have also demonstrated that the tires produced in accordance with these advantageous embodiments of the disclosure, according to which the content of reinforcing filler is reduced compared to more customary embodiments for the elastomer compounds in question, have improved performance levels in terms of rolling resistance. Specifically, the presence of elastomer compounds comprising a low filler content results in reduced hysteresis values compared to those of more customary compounds.

Preferentially, the disclosure relates to a composition as defined above in which $R_1$, $R_2$ and $R_3$ independently represent a hydrogen atom or a methyl group. More preferentially, $R_2$ and $R_3$ each represent a hydrogen atom. More preferentially also, $R_1$ represents a methyl group.

Preferably, the disclosure relates to a composition as defined above in which the amount of zinc diacrylate derivative in the composition is within a range extending from 5 to 40 phr (parts by weight per hundred parts by weight of elastomer), preferably from 7 to 35 phr.

Preferentially, the disclosure relates to a composition as defined above in which the peroxide is an organic peroxide, preferentially present in an amount less than or equal to 3 phr. More preferentially, the amount of peroxide in the composition is within a range extending from 0.1 to 3 phr, more preferably from 0.2 to 2.5 phr, and more preferentially still from 0.25 to 1.8 phr.

Preferentially, the disclosure relates to a composition as defined above in which the ratio of the peroxide content to the zinc diacrylate derivative content is between 0.01 and 0.09, preferably between 0.03 and 0.09, and more preferentially between 0.05 and 0.08.

It is recalled here that elastomer (or "rubber", the two terms being regarded as synonymous) of the "diene" type should be understood, in a known way, as meaning an (one or more is understood) elastomer resulting at least in part (i.e., a homopolymer or a copolymer) from diene monomers (monomers bearing two conjugated or non-conjugated carbon-carbon double bonds).

Preferentially, the disclosure relates to a composition as defined above in which the content of reinforcing filler is within a range extending from 5 to 60 phr, more preferentially from 10 to 50 phr, better still from 20 to 40 phr.

Preferably, the disclosure relates to a composition as defined above, in which the reinforcing filler is carbon black, silica or a mixture of the two. Preferably, the reinforcing filler is predominantly composed of carbon black.

Preferentially, the disclosure relates to a composition as defined above in which the ratio of the filler content to the zinc diacrylate derivative content is within a range extending from 0.15 to 3, preferably from 1.5 to 3, alternatively and preferentially also from 0.7 to 1.3.

Preferably, the disclosure relates to a composition as defined above that contains no molecular sulfur or sulfur donor as vulcanization agent or contains less than 0.5 phr thereof. Preferentially, the composition contains no molecular sulfur or sulfur donor as vulcanization agent or contains less than 0.3 phr and preferably less than 0.1 phr thereof. Preferentially, the composition contains no vulcanization accelerator.

Preferentially, the disclosure relates to a composition as defined above that contains no antioxidant.

Preferentially also, the disclosure relates to a composition as defined above additionally comprising a plasticizer preferably chosen from plasticizing resins, extender oils and mixtures thereof.

In the present application, the expression "phr" means, in a known manner, parts by weight per hundred parts by weight of elastomer. The amount by weight of the constituents of the compositions is thus expressed relative to the total amount of elastomers by weight which is considered by convention to be the value one hundred.

The expression "composition based on" should be understood as meaning a composition comprising the mixture and/or the product of the in situ reaction of the various base constituents used, some of these constituents being able to react and/or being intended to react with one another, at least partially, during the various phases of manufacture of the composition or during the subsequent curing, modifying the composition as it is prepared at the start. Thus, the compositions as employed for the disclosure can be different in the non-crosslinked state and in the crosslinked state.

In the present description, unless expressly indicated otherwise, all the percentages (%) shown are percentages by weight. Furthermore, any range of values denoted by the expression "between a and b" represents the range of values extending from more than a to less than b (that is to say, limits a and b excluded), whereas any range of values denoted by the expression "from a to b" means the range of values extending from a up to b (that is to say, including the strict limits a and b).

According to one embodiment of the disclosure, the crown reinforcement of the tire is formed of at least two working crown layers of inextensible reinforcing elements that are crossed from one layer to the other, forming angles of between 10° and 45° with the circumferential direction.

According to other embodiments of the disclosure, the crown reinforcement also comprises at least one layer of circumferential reinforcing elements.

One embodiment of the disclosure also provides for the crown reinforcement to be supplemented radially on the outside by at least one additional layer, referred to as a protective layer, of reinforcing elements, referred to as elastic reinforcing elements, that are oriented with respect to the circumferential direction at an angle of between 10° and 45° and in the same direction as the angle formed by the inextensible elements of the working layer which is radially adjacent thereto.

According to any one of the embodiments of the disclosure mentioned above, the crown reinforcement may furthermore be supplemented, radially on the inside between the carcass reinforcement and the radially internal working layer closest to the carcass reinforcement, by a triangulation layer formed of metal inextensible reinforcing elements that are made of steel and form, with the circumferential direction, an angle of more than 60° and in the same direction as that of the angle formed by the reinforcing elements of the radially closest layer of the carcass reinforcement.

BRIEF DESCRIPTION OF THE DRAWING

Other details and advantageous features of the disclosure will become apparent hereinafter from the description of exemplary embodiments of the disclosure, with reference to the FIGURE which depicts a meridian view of a partial diagram of a tire according to the disclosure.

In order to make it easier to understand, the FIGURE is not drawn to scale. The FIGURE shows only a half-view of a tire which extends symmetrically about the axis XX' which represents the circumferential median plane, or equatorial plane, of a tire.

DETAILED DESCRIPTION OF THE ENABLING EMBODIMENT

In the FIGURE, the tire 1, of size 295/80 R 22.5, comprises a radial carcass reinforcement 2 anchored in two beads around bead wires. The carcass reinforcement 2 is formed of a single layer of metal cords. The carcass reinforcement 2 is hooped by a crown reinforcement 3, itself capped by a tread 4.

The low regions and the beads of the tire 1 are notably not depicted in the FIGURE.

In the FIGURE, the crown reinforcement 3 is formed radially from the inside to the outside:

- of a triangulation layer 31 formed of non-wrapped 9.28 inextensible metal cords, oriented at an angle equal to 65°,
- of a first working layer 32 formed of non-wrapped 11.35 inextensible metal cords, which are continuous across the entire width of the ply, and oriented at an angle equal to 26°,
- of a second working layer 33 formed of non-wrapped 11.35 inextensible metal cords, which are continuous over the entire width of the ply, oriented at an angle equal to 18°, and crossed with the metal cords of the first working layer,
- of a protective layer 34 formed of non-wrapped 6.35 elastic metal cords which are continuous over the entire width of the ply and oriented at an angle of 18° in the same direction as the metal cords of the working layer 33.

According to the disclosure, a layer P of rubber compound is placed between the carcass reinforcement 2 and the first working layer 32.

As explained above, when an object pierces the tire and remains in place, the air leak is limited since the object seals the hole that it has formed. Such a leak may be virtually imperceptible to the driver. This is even truer when the vehicle is equipped with an automatic tire reinflation device in order to maintain a setpoint pressure.

In many cases, although this slight air leak is imperceptible, it leads to the presence of an air passage, or even to the formation of an air pocket within the constituent polymer masses of the tire, in particular promoting the propagation of the cracks initiated during the penetration of the object. This phenomenon is even more significant since the air present is substantially at the pressure of the inflation air and thus of the order of 9 to 11 bar for a tire fitted to a vehicle of the heavy-duty type and in a zone where the temperatures of the compounds are high, especially in the case of "road" tires, which are intended to run at high speed.

The presence of the elastomer compounds in accordance with the disclosure especially in the layer P and in the calendering layers of the layer 2 of the carcass reinforcement.

Various tires were produced with elastomer compounds having a relative density of sulfur bridges measured according to the equilibrium swelling method of less than 5%.

The composition used to produce the layer P and the calendering layer of the working layer and to make it possible to obtain a relative density of sulfur bridges measured according to the equilibrium swelling method of less than 5% is the following:

|  |  |
|---|---|
| NR (1) | 100 |
| ZDA derivative (2) | 20 |
| Peroxide (3) | 1.5 |
| Peroxide/ZDA derivative | 0.075 |
| Filler (4) | 40 |
| Filler/ZDA derivative | 2 |
| ZnO (5) | 6 |

(1) Natural rubber
(2) "DIMALINK 634" zinc dimethacrylate (ZDMA) from CRAY VALLEY
(3) "Dicup" dicumyl peroxide from Hercules
(4) N326 ASTM grade carbon black (Cabot)
(5) Zinc oxide (industrial grade-Umicore)

The composition used to produce the calendering layers of the carcass reinforcement layer and to make it possible to obtain a relative density of sulfur bridges measured according to the equilibrium swelling method of less than 5% is the following:

|  |  |
|---|---|
| NR (1) | 100 |
| ZDA derivative (2) | 20 |
| Peroxide (3) | 1.5 |
| Peroxide/ZDA derivative | 0.075 |
| Filler (4) | 20 |
| Filler/ZDA derivative | 1 |
| ZnO (5) | 6 |

The compositions described above result in a relative density of ionic bridges of the order of 80% and a relative density of carbon/carbon bridges of the order of 20%.

It turns out that the kinematics of curing the rubber compounds having a relative density of sulfur bridges measured according to the equilibrium swelling method of less than 5% are different from those of the more customary compounds in tire manufacture. In order to facilitate the curing of the various compounds, the inventors applied methods similar to those of retreading operations in order to allow a curing of the tread independent of the curing of the other compounds. The curing of the various zones of the tire may thus be controlled.

A first tire P1 according to the disclosure comprises a layer P, the radially innermost calendering layer of the working layer 32 and the calendering layers of the carcass reinforcement layer, the rubber compounds of which are produced with the compositions described above.

A second tire P2 according to the disclosure comprises a layer P and the calendering layers of the carcass reinforcement layer, the rubber compounds of which are produced with the compositions described above.

A third tire P3, not in accordance with the disclosure, comprises only a layer P, the rubber compounds of which are produced with the composition described above and have a relative density of sulfur bridges measured according to the equilibrium swelling method of less than 5%.

A fourth tire P4, not in accordance with the disclosure, comprises only calendering layers of the carcass reinforcement layer, the rubber compounds of which are produced with the composition described above and have a relative density of sulfur bridges measured according to the equilibrium swelling method of less than 5%.

A reference tire is produced, comprising no rubber compound having a relative density of sulfur bridges measured according to the equilibrium swelling method of less than 5%.

Running tests were carried out with these four tires to evaluate the performance levels thereof in terms of endurance.

Before carrying out the tests, the tires are subjected to a pretreatment that consists, on the one hand, of artificially wearing down the tread as far as the tread wear indicators and, on the other hand, an accelerated ageing in an oven under harsh conditions in terms of temperature and of oxygen content in the inflation air.

Furthermore, the tires are punctured using a nail having a 3 mm diameter from the tread as far as the cavity of the tire, passing through the layer P, the nail then being kept in place during the tests.

The distance travelled is measured until the tire exhibits a degradation that prohibits the retreading thereof. The measurements illustrated below are referenced to a base 100 for the reference tire.

|  | R | P1 | P2 | P3 | P4 |
|---|---|---|---|---|---|
| km | 100 | 130 | 120 | 100 | 100 |

These tests demonstrate that the presence of the polymer compounds in the layer P and in the calenderings of the carcass reinforcement layer makes it possible to limit the rate of propagation of the incipient cracks created during the penetration of the nail which pierces the tire.

The invention claimed is:

1. A tire having a radial carcass reinforcement, said radial carcass reinforcement including at least one layer formed of reinforcing elements inserted between two calendering layers of an elastomer compound, said tire comprising a crown reinforcement comprising at least two working crown layers of reinforcing elements, said crown reinforcement being itself capped radially by a tread, said tread being joined to two beads via two sidewalls, said tire comprising at least one layer P of polymer compounds in contact with at least one working crown layer and in contact with the carcass reinforcement, said at least one layer P of polymer compound extending axially to at least the axial end of the tread, wherein at least the elastomer compounds forming the calendering layer, radially outermost with respect to the crown of the tire, of said at least one carcass reinforcement layer having a relative density of sulfur bridges measured according to the equilibrium swelling method less than 5%, wherein the elastomer compounds forming said at least one layer P having a relative density of sulfur bridges measured according to the equilibrium swelling method less than 5% and wherein said elastomer compounds forming the calendering layer, radially outermost with respect to the crown of the tire, of said at least one carcass reinforcement layer and said elastomer compounds forming said at least one layer P are compositions based on at least one diene elastomer selected from the group of diene elastomers consisting of polybutadienes (abbreviated to "BRs"), synthetic polyisoprenes (IRs), natural rubber (NR), isoprene copolymers, butadiene copolymers with the exception of butadiene-nitrile copolymers (NBRs), excluding diene elastomers bearing carboxyl functions, and mixtures of these diene elastomers.

2. The tire according to claim 1, wherein said elastomer compounds forming the calendering layer, radially outermost with respect to the crown of the tire, of said at least one carcass reinforcement layer and said elastomer compounds forming said at least one layer P are compositions based on at least one diene elastomer, a zinc diacrylate derivative in the form of a zinc salt of formula (I)

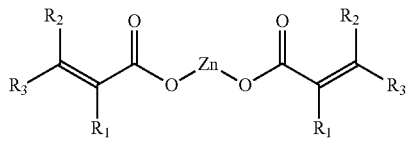

in which $R_1$, $R_2$ and $R_3$ independently represent a hydrogen atom or a $C_1$-$C_7$ hydrocarbon group selected from among linear, branched or cyclic alkyl groups, aralkyl groups, alkylaryl groups and aryl groups, optionally interrupted by one or more heteroatoms, it being possible for $R_2$ and $R_3$ to together form a nonaromatic ring, said compositions additionally comprising a peroxide, the zinc diacrylate derivative and peroxide contents being such that the ratio of the peroxide content to the zinc diacrylate derivative content is less than or equal to 0.09.

3. The tire according to claim 2, wherein the peroxide is an organic peroxide, present in an amount less than or equal to 3 phr.

4. The tire according to either of claim 2, wherein the ratio of the peroxide content to the zinc diacrylate derivative content is between 0.01 and 0.09.

5. The tire according to claim 1, wherein the elastomer compounds forming the two calendering layers of said at least one carcass reinforcement layer have a relative density of sulfur bridges measured according to the equilibrium swelling method less than 5%.

6. The tire according to claim 1, said at least two working crown layers each being formed of reinforcing elements inserted between two calendering layers of elastomer compounds, wherein at least the elastomer compounds forming the calendering layer, radially closest to the carcass reinforcement, of a working crown layer have a relative density of sulfur bridges measured according to the equilibrium swelling method less than 7%.

7. The tire according to claim 6, wherein at least the elastomer compounds forming the calendering layers of the working crown layer radially closest to the carcass reinforcement have a relative density of sulfur bridges measured according to the equilibrium swelling method less than 5%.

8. The tire according to claim 1, wherein the relative density of ionic bridges measured according to the equilibrium swelling method is greater than 50% in said elastomer compounds having a relative density of sulfur bridges measured according to the equilibrium swelling method less than 5%.

9. The tire according to claim 1, wherein the relative density of carbon-carbon bridges measured according to the equilibrium swelling method is less than 45% in said elastomer compounds having a relative density of sulfur bridges measured according to the equilibrium swelling method less than 5%.

10. The tire according to claim 1, wherein the crown reinforcement of the tire is formed of at least two working crown layers of inextensible reinforcing elements, crossed from one layer to the other, forming angles of between 10° and 45° with the circumferential direction.

11. The tire according to claim 1, wherein the crown reinforcement also comprises at least one layer of circumferential reinforcing elements.

12. The tire according to claim 1, wherein the crown reinforcement is supplemented radially on the outside by at least one additional ply, referred to as a protective ply, of reinforcing elements, referred to as elastic reinforcing elements, that are oriented with respect to the circumferential direction at an angle of between 10° and 45° and in the same direction as the angle formed by the inextensible elements of the working ply which is radially adjacent thereto.

13. The tire according to claim 1, wherein the crown reinforcement also has a triangulation layer formed of metal reinforcing elements that form angles of more than 60° with the circumferential direction.

* * * * *